US011678237B2

(12) United States Patent
Kadiri et al.

(10) Patent No.: US 11,678,237 B2
(45) Date of Patent: Jun. 13, 2023

(54) INTER-CORE NETWORK RESELECTION CONTROL

(71) Applicant: QUALCOMM Incorporated, San Diego, CA (US)

(72) Inventors: Prasad Reddy Kadiri, San Diego, CA (US); Mungal Singh Dhanda, Slough (GB); Umesh Phuyal, San Diego, CA (US); Sebastian Speicher, Wallisellen (CH); Miguel Griot, La Jolla, CA (US); Masato Kitazoe, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/853,521

(22) Filed: Apr. 20, 2020

(65) Prior Publication Data
US 2020/0344653 A1    Oct. 29, 2020

Related U.S. Application Data

(60) Provisional application No. 62/838,761, filed on Apr. 25, 2019.

(51) Int. Cl.
*H04W 36/00* (2009.01)
*H04W 36/14* (2009.01)
*H04W 36/08* (2009.01)

(52) U.S. Cl.
CPC ..... *H04W 36/00835* (2018.08); *H04W 36/08* (2013.01); *H04W 36/14* (2013.01)

(58) Field of Classification Search
CPC ..... H04W 36/00; H04W 36/08; H04W 36/14; H04W 36/16; H04W 36/04; H04W 36/18;
(Continued)

(56) References Cited

U.S. PATENT DOCUMENTS

| 2013/0053035 | A1* | 2/2013 | Johansson et al. ........... 455/436 |
| 2014/0349653 | A1* | 11/2014 | Kanamarlapudi et al. ................. H04W 36/0088 |
| 2019/0349825 | A1* | 11/2019 | Tseng et al. .... H04W 36/00835 |
| 2020/0187070 | A1* | 6/2020 | Wang et al. .... H04W 36/00837 |
| 2020/0187073 | A1* | 6/2020 | Ma et al. .............. H04W 36/14 |

FOREIGN PATENT DOCUMENTS

EP    3668183 A1    6/2020
SE    WO 2020104194 A1 *    5/2020    ............ H04W 48/18
(Continued)

OTHER PUBLICATIONS

International Search Report and Written Opinion—PCT/US2020/029084—ISA/EPO—dated Jul. 10, 2020.
(Continued)

*Primary Examiner* — Meless N Zewdu
(74) *Attorney, Agent, or Firm* — Harrity & Harrity, LLP

(57) ABSTRACT

Various aspects of the present disclosure generally relate to wireless communication. In some aspects, a user equipment (UE) may receive, from a serving cell, signaling identifying a core network type cell ranking offset parameter. The UE may rank, based at least in part on the core network type cell ranking offset parameter, a neighbor cell for reselection relative to the serving cell, wherein the neighbor cell is associated with a different core network type than the serving cell. The UE may selectively reselect to the neighbor cell based at least in part on ranking the neighbor cell for reselection relative to the serving cell. Numerous other aspects are provided.

50 Claims, 10 Drawing Sheets

(58) Field of Classification Search
CPC .......... H04W 36/34; H04W 36/00835; H04W 36/0061; H04W 36/0038; H04W 36/30; H04W 48/20; H04W 16/32; H04W 88/00; H04W 88/02; H04W 88/06; H04W 88/08; H04W 72/06; H04W 72/10; H04W 48/18; H04W 76/16; H04W 36/385; H04W 36/36; H04W 36/0085; H04W 36/0083; H04W 28/0831; H04W 28/0835; H04W 28/0838; H04W 28/0842; H04W 28/08; H04W 36/0011; H04W 36/0016; H04W 36/0022; H04W 76/11; H04W 76/10; H04W 76/00; H04W 36/00837; H04W 36/0094
See application file for complete search history.

(56) References Cited

FOREIGN PATENT DOCUMENTS

| WO | 2019029416 A1 | 2/2019 | |
|---|---|---|---|
| WO | WO 2019029416 A1 * | 2/2019 | ........ H04W 36/0061 |

OTHER PUBLICATIONS

"3rd Generation Partnership Project; Technical Specification Group Services and System Aspects; Study on Cellular Internet of Things (IoT) support and evolution for the 5G System (Release 16)", 3GPP Standard; Technical Report; 3GPP TR 23.724. 3rd Generation Partnership Project (3GPP), Mobile Competence Centre; 650, Route Des Lucioles ; F-06921, Sophia-Antipolis Cedex ; France, vol. SA WG2. No. V16.0.0, Dec. 19, 2018 (Dec. 19, 2018), pp. 1-276, XP051591216, [retrieved on Dec. 19, 2018], paragraph [6.51.12].
Qualcomm Incorporated et al., "Core Network Steering via CN Type Selection Rules Configuration/reconfiguration", 3GPP Draft; S2-1811581, E-Mail Revision 3 of 1811451, 3rd Generation Partnership-Project (3GPP), Mobile Competence Centre; 650. Route Des Lucioles; F-06921 Sophia-Antipolis Cedex; France, vol. SA WG2. No. Dongguan. P.R. China; Oct. 15, 2018-Oct. 19, 2018, Oct. 26, 2018 (Oct. 26, 2018), 4 Pages, XP051486020, Retrieved from the Internet: URL:http://www.3gpp.org/ftpjtsg%5FsajWG2%5FArch/TSGS2%5F129%5FDongguanjDocsjS2%2D1811581%2Ezip [retrieved on Oct. 26, 2018], p. 1. paragraph 1—p. 2.

* cited by examiner

INTER-CORE NETWORK RESELECTION CONTROL

CROSS-REFERENCE TO RELATED APPLICATION

This patent application claims priority to U.S. Provisional Patent Application No. 62/838,761, filed on Apr. 25, 2019, entitled "INTER-CORE NETWORK RESELECTION CONTROL," and assigned to the assignee hereof. The disclosure of the prior application is considered part of and is incorporated by reference in this patent application.

FIELD OF THE DISCLOSURE

Aspects of the present disclosure generally relate to wireless communication and to techniques and apparatuses for inter-core network reselection control.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving, from a serving cell, signaling identifying a core network type cell ranking offset parameter; ranking, based at least in part on the core network type cell ranking offset parameter, a neighbor cell for reselection relative to the serving cell, wherein the neighbor cell is associated with a different core network type than the serving cell; and selectively reselecting to the neighbor cell based at least in part on ranking the neighbor cell for reselection relative to the serving cell.

In some aspects, a UE for wireless communication may include memory and one or more processors operatively coupled to the memory. The memory and the one or more processors may be configured to receive, from a serving cell, signaling identifying a core network type cell ranking offset parameter; rank, based at least in part on the core network type cell ranking offset parameter, a neighbor cell for reselection relative to the serving cell, wherein the neighbor cell is associated with a different core network type than the serving cell; and selectively reselect to the neighbor cell based at least in part on ranking the neighbor cell for reselection relative to the serving cell.

In some aspects, a non-transitory computer-readable medium may store one or more instructions for wireless communication. The one or more instructions, when executed by one or more processors of a UE, may cause the one or more processors to receive, from a serving cell, signaling identifying a core network type cell ranking offset parameter; rank, based at least in part on the core network type cell ranking offset parameter, a neighbor cell for reselection relative to the serving cell, wherein the neighbor cell is associated with a different core network type than the serving cell; and selectively reselect to the neighbor cell based at least in part on ranking the neighbor cell for reselection relative to the serving cell.

In some aspects, an apparatus for wireless communication may include means for receiving, from a serving cell, signaling identifying a core network type cell ranking offset parameter; means for ranking, based at least in part on the core network type cell ranking offset parameter, a neighbor cell for reselection relative to the serving cell, wherein the neighbor cell is associated with a different core network type than the serving cell; and means for selectively reselecting to the neighbor cell based at least in part on ranking the neighbor cell for reselection relative to the serving cell.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
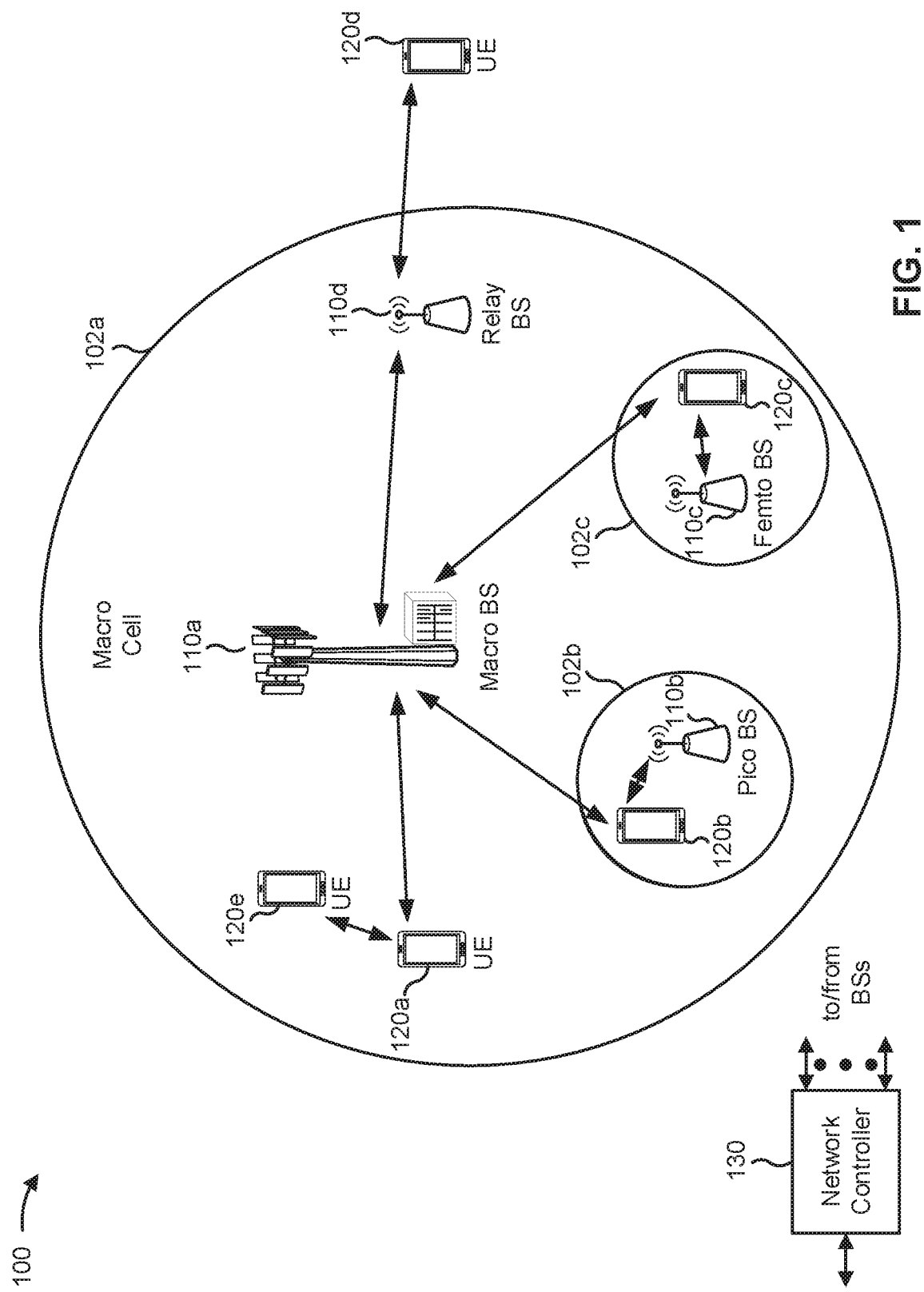
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
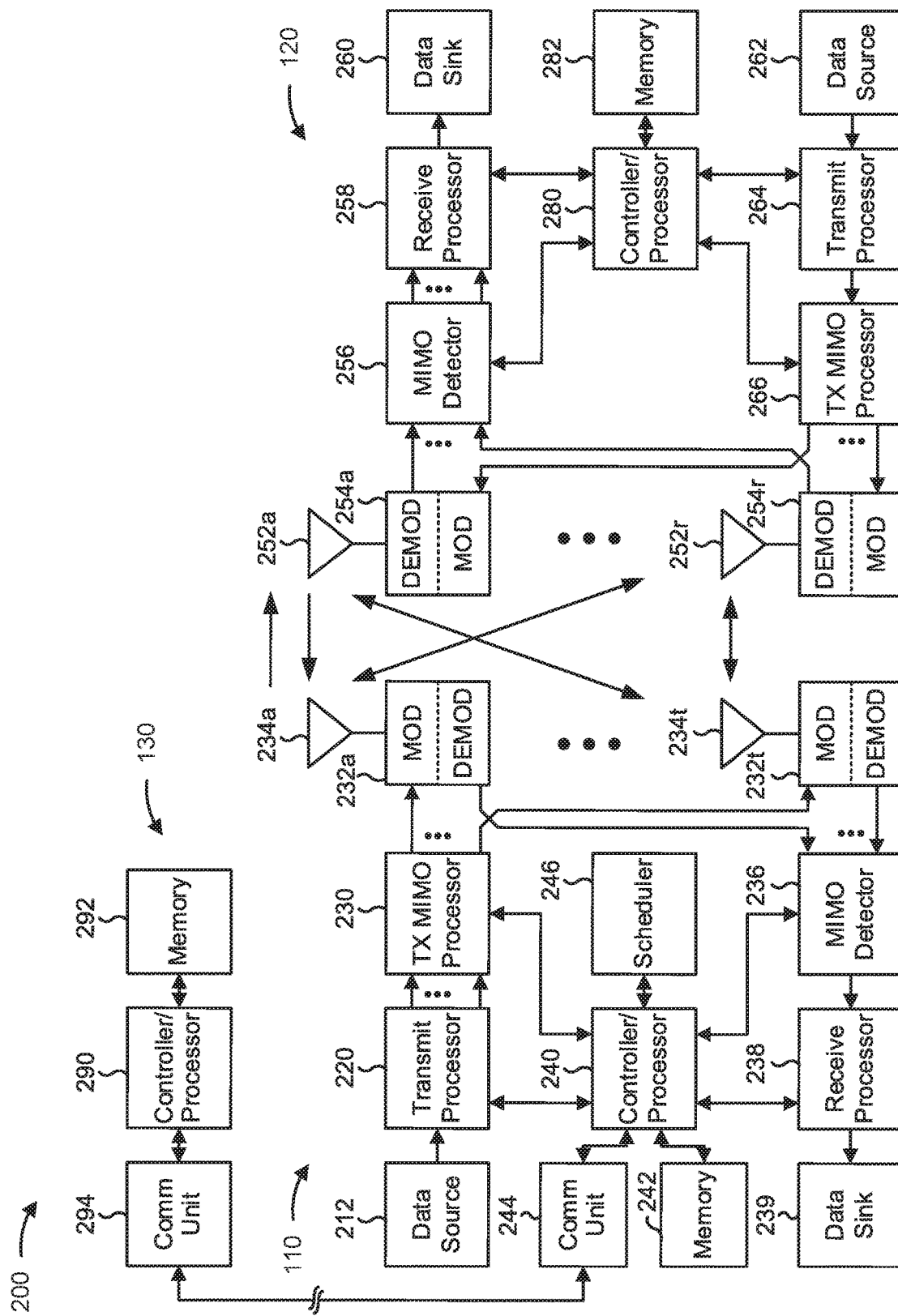
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with inter-core network reselection control, as described in more detail elsewhere herein. For example, controller/processor 240 of base station 110, controller/processor 280 of UE 120, and/or any other component(s) of FIG. 2 may perform or direct operations of, for example, process 900 of FIG. 9 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving, from a serving cell, signaling identifying a core network type cell ranking offset parameter; means for ranking, based at least in part on the core network type cell ranking offset parameter, a neighbor cell for reselection relative to the serving cell, wherein the neighbor cell is associated with a different core network type than the serving cell; means for selectively reselecting to the neighbor cell based at least in part on ranking the neighbor cell for reselection relative to the serving cell, and/or the like. In some aspects, such means may include one or more components of UE 120 described in connection with FIG. 2.

As indicated above, FIG. 2 is provided as an example. Other examples may differ from what is described with regard to FIG. 2.

Figure 3:
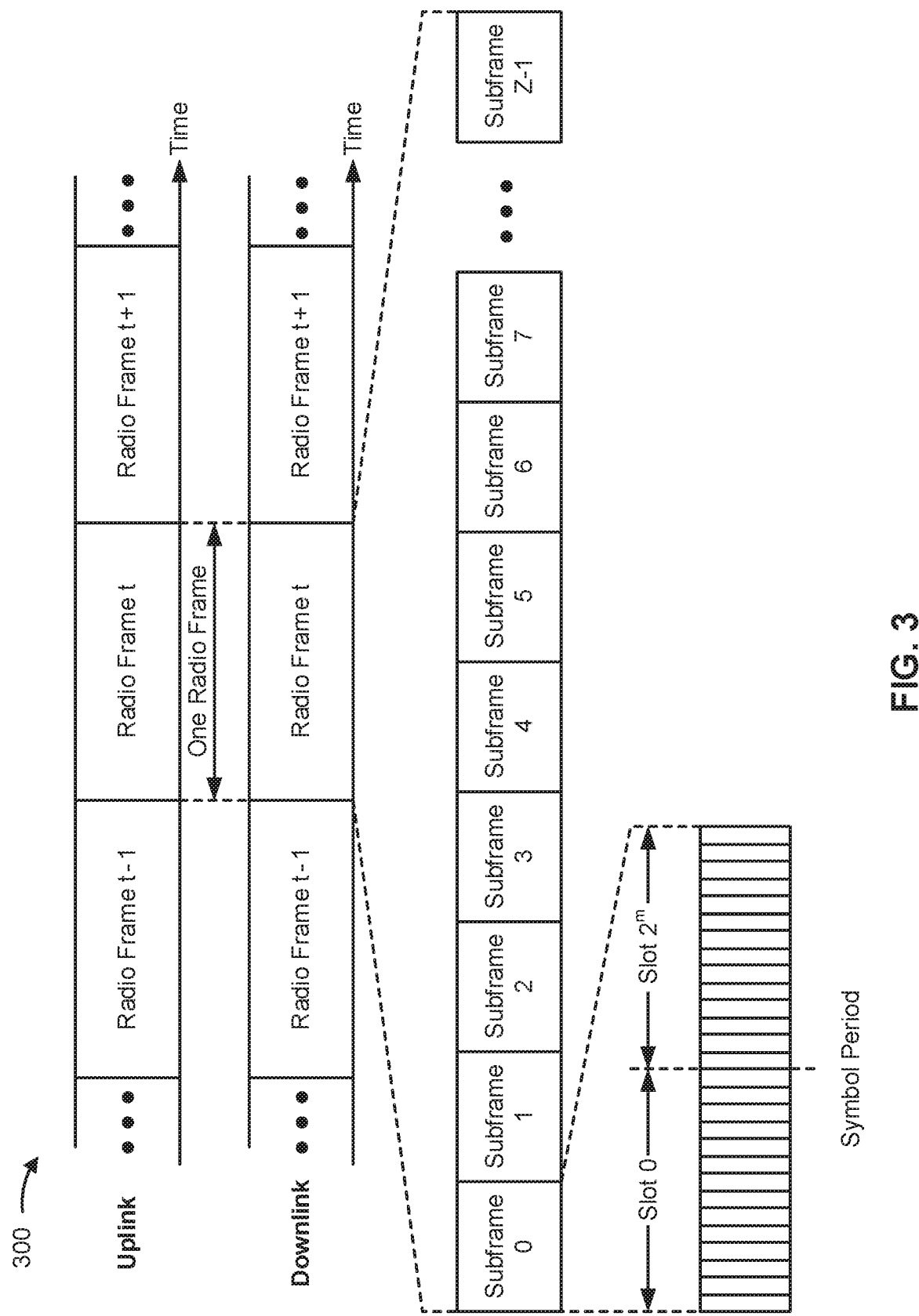
FIG. 3 is a block diagram conceptually illustrating an example of a frame structure in a wireless communication network, in accordance with various aspects of the present disclosure.

FIG. 3 shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3, where m is a numerology used for a transmission, such as 0, 1, 2, 3, 4, and/or the like). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3 may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks).

As indicated above, FIG. 3 is provided as an example. Other examples may differ from what is described with regard to FIG. 3.

Figure 4:
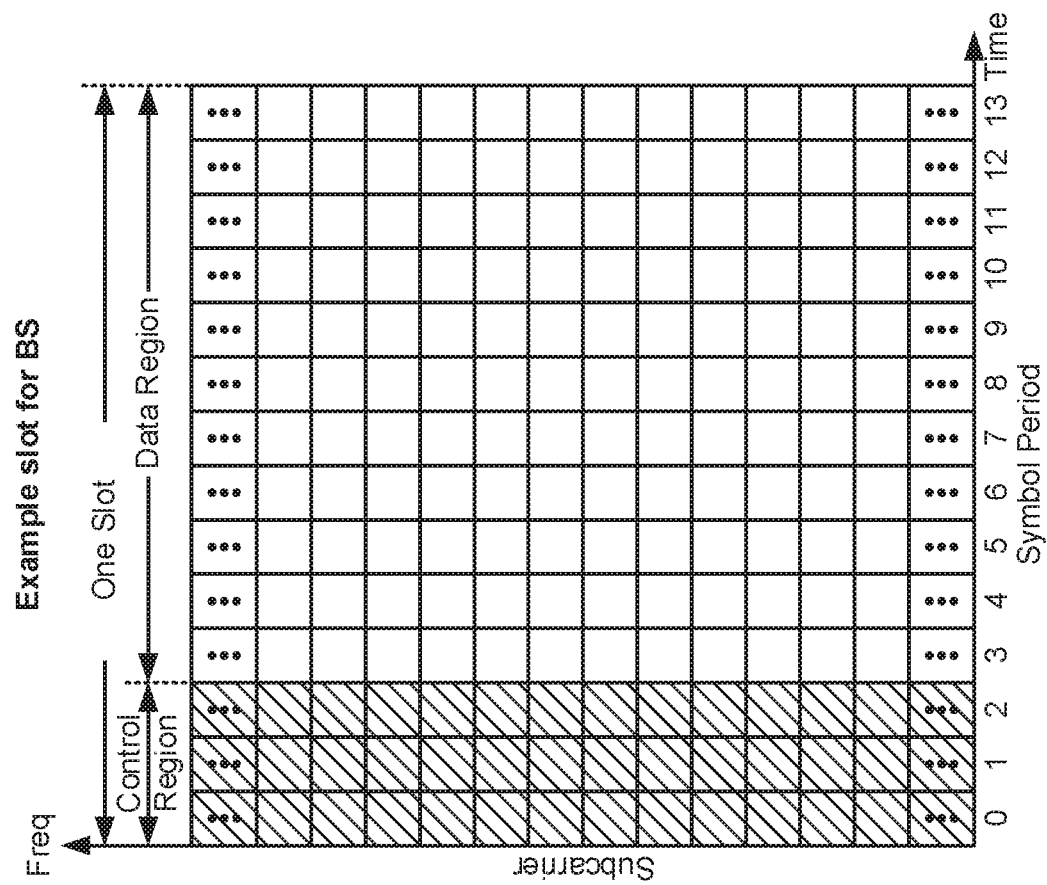
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
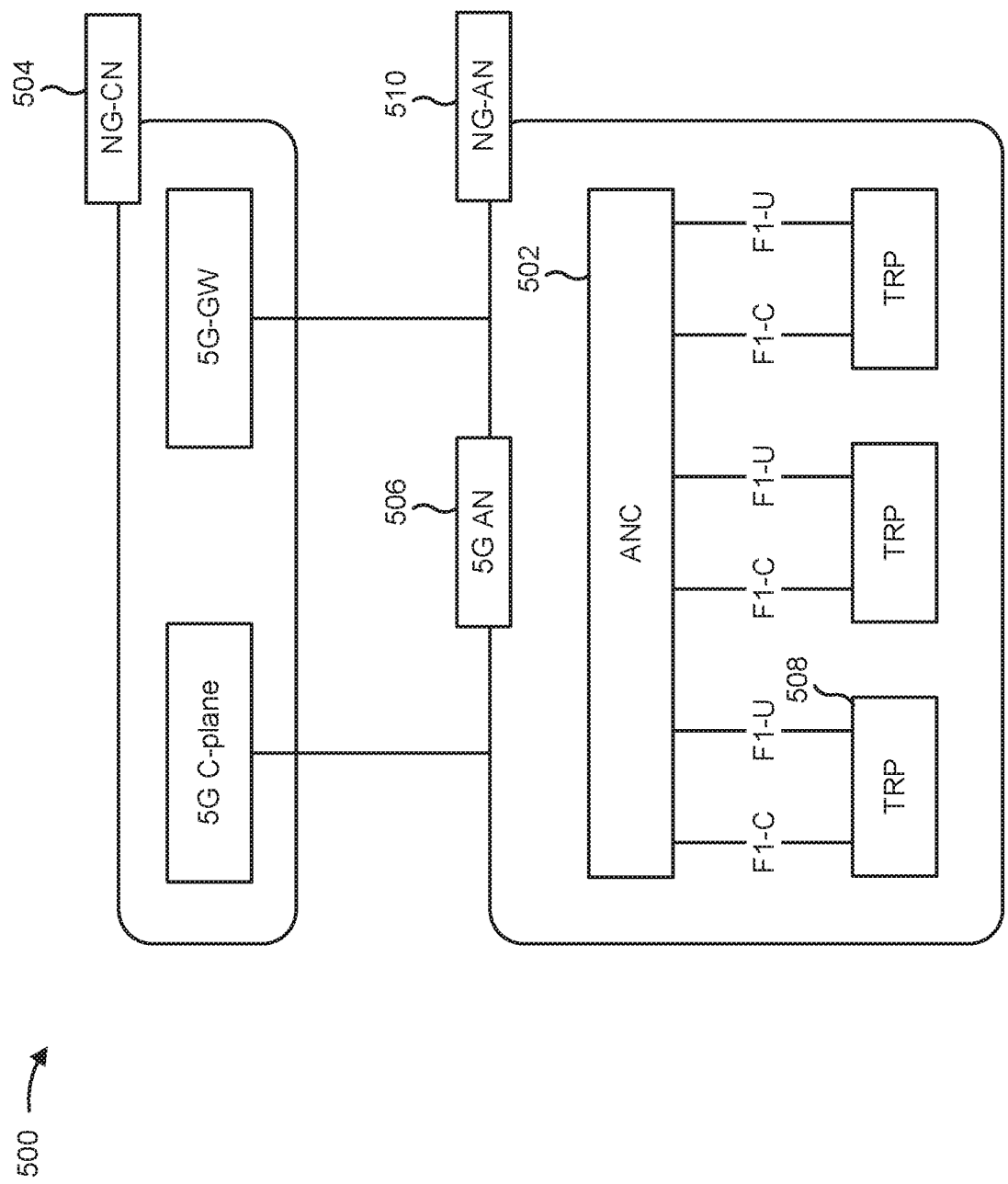
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided as an example. Other examples may differ from what is described with regard to FIG. 5.

Figure 6:
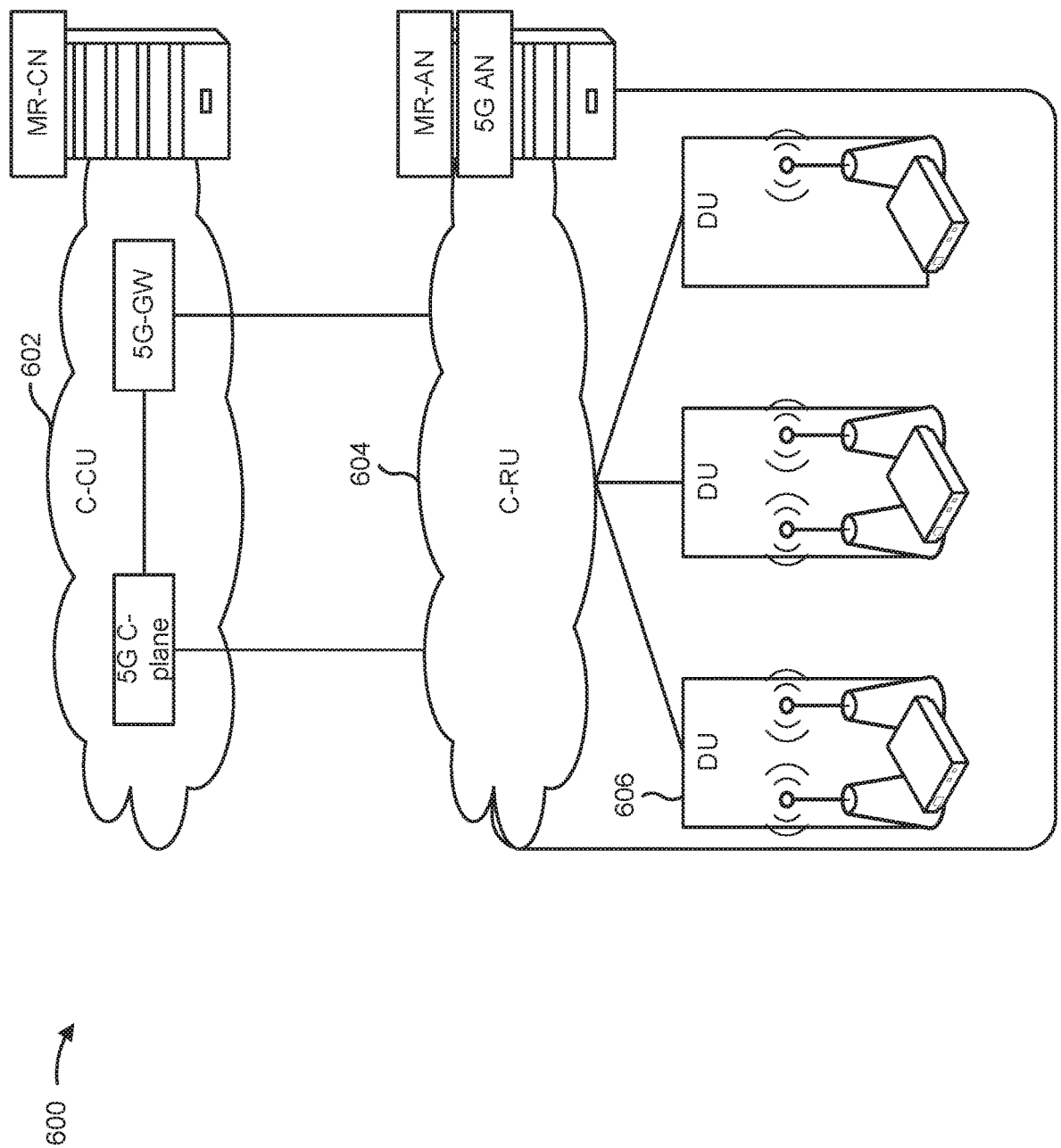
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided as an example. Other examples may differ from what is described with regard to FIG. 6.

In some network deployments, available BSs may provide access to different types of core networks. For example, a UE may be within range of a first BS that uses an evolved packet core network (EPC), a second BS that uses a 5G core network (5GC), and/or the like. In some cases, a single BS may provide access to a plurality of different types of core networks. For example, the first BS may provide access to both an EPC and a 5GC. Some UEs, such as narrowband Internet of Things (NB-IoT) UEs, may be configured to connect to a plurality of different types of core networks, such as being configured to connect to both the EPC and the 5GC. In this case, a UE may connect to a single core network of a plurality of different types of core networks (e.g., either the EPC or the 5GC) available in connection with a single cell of a single BS.

To connect to a core network, the UE may select to a serving cell associated with the core network on a first frequency. The UE may subsequently reselect to a second frequency, which may be associated with the same type of core network or a different type of core network. However, reselection between different types of core networks may result in excessive signaling overhead to perform registration procedures, tracking area update procedures, UE context transfer procedures, and/or the like. Such signaling overhead may be particularly detrimental to operation of networks with deployments of thousands, millions, or billions of UEs, such as in massive NB-IoT types of deployments. Moreover, a transfer between types of core networks may result in a UE using excessive power resources, which may reduce performance for low-power UEs, such as NB-IoT UEs.

Some aspects described herein provide for inter-core network reselection control. For example, a UE may account for whether a reselection to a neighbor cell is an inter-core network reselection when ranking neighbor cells for reselection. In this case, the UE may selectively reselect to the neighbor cell based at least in part on the ranking of neighbor cells. In this way, by accounting for whether the reselection is an inter-core network reselection, the UE reduces a likelihood of performing an inter-core network reselection to a neighbor cell associated with a different type of core network than a serving cell of the UE. In this way, the UE may reduce signaling overhead, utilization of power resources, and/or the like.

Moreover, the UE may, in some cases, still allow inter-core network reselection. For example, the UE may reselect to a particular neighbor cell associated with a different type of core network that is associated with other factors that are significantly better than those of other available neighbor cells with a same type of core network as a serving cell. In other words, the UE may perform an inter-core network reselection when a neighbor cell is associated with, for example, significantly better cell quality than other neighbor cells to compensate for the reselection being an inter-core network reselection. In this way, the UE ensures that the UE does not remain on or reselect to a cell with poor quality, thereby improving performance relative to disabling all inter-core network reselections.

Figure 7:
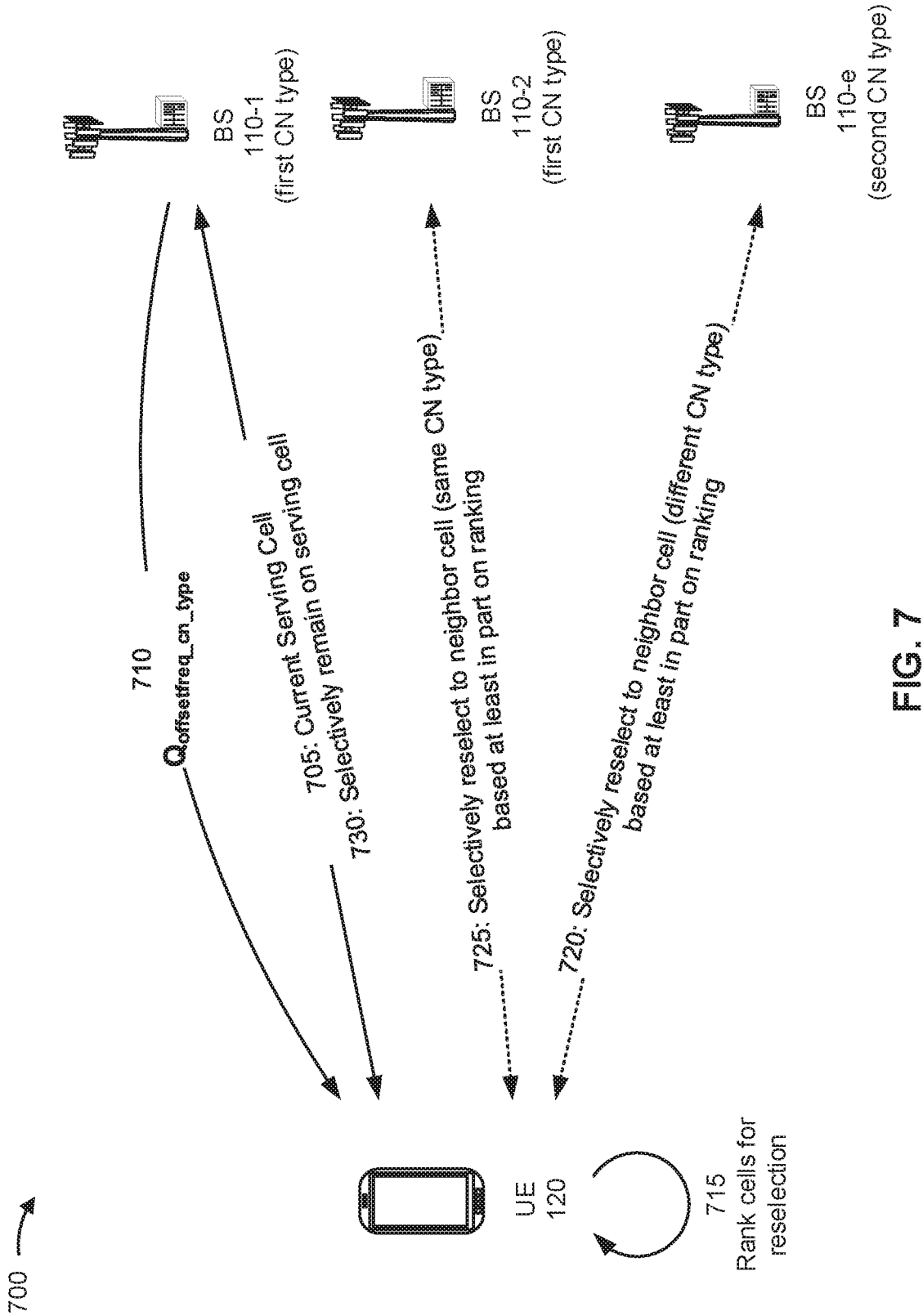
FIG. 7 is a diagram illustrating an example of inter-core network reselection control, in accordance with various aspects of the present disclosure.

FIG. 7 is a diagram illustrating an example 700 of inter-core network reselection control, in accordance with various aspects of the present disclosure. As shown in FIG. 7, example 700 includes a UE 120, a BS 110-1 associated with a first type of core network (CN), a BS 110-2 associated with the first type of core network, and a BS 110-3 associated with a second type of core network. Although some aspects are described herein in terms of a particular set of core network capabilities, other core network capabilities are contemplated, such as other types of core networks, other quantities of types of core networks provided by each BS 110, and/or the like.

As further shown in FIG. 7, and by reference number 705, UE 120 may be camping on BS 110-1. For example, UE 120 may be connected to the first type of core network, such as an EPC or 5GC, via a serving cell on BS 110-1. In some aspects, BS 110-1 may provide a plurality of types of core networks. For example, BS 110-1 may provide connection to both the EPC and the 5GC. In this case, UE 120 may be connected to a single core network of the plurality of types of core networks. For example, UE 120 may connect to the EPC via a particular frequency of BS 110-1.

As further shown in FIG. 7, and by reference number 710, UE 120 may receive signaling identifying a core network type cell ranking offset parameter ($Q_{offsetfreq\_cn\_type}$). For example, BS 110-1 may provide the signaling to indicate a factor accounting for whether a cell reselection is an inter-core network reselection for determining a ranking of cells for reselection.

In some aspects, BS 110-1 may transmit a system information block (SIB) type of message to convey the core network type cell ranking offset parameter. Additionally, or alternatively, UE 120 may receive an indication of whether to use the core network type cell ranking offset parameter (e.g., that is already configured, such as a stored core network type cell ranking offset parameter) via a SIB. For example, BS 110-1 may provide a SIB to indicate that UE 120 is to account for core network type when ranking cells for reselection. In some aspects, accounting for core network type may be configured on a per public land mobile network (PLMN) basis. For example, BS 110-1 may provide the SIB to each UE 120 on a single PLMN. Additionally, or alternatively, accounting for core network type may be configured for all PLMNs and a group of BSs 110 may provide respective SIBs to each UE 120 on each PLMN. In this case, a network device may provide an indication to the group of BSs 110 indicating that the group of BSs 110 are to provide the respective SIBs.

As further shown in FIG. 7, and by reference number 715, UE 120 may rank neighbor cells for reselection. For example, for a first neighbor cell (e.g., BS 110-3) that is associated with a different type of core network than a type of core network to which UE 120 is connected, UE 120 may rank the first neighbor cell based at least in part on the core network type cell ranking offset parameter. Additionally, or alternatively, UE 120 may rank the first neighbor cell based at least in part on another parameter. For example, UE 120 may rank the first neighbor cell based at least in part on a cell quality parameter, a cell hysteresis parameter, a temporary offset parameter, a cell ranking offset parameter, a single cell point-to-multipoint parameter, a combination thereof, and/or the like. In some aspects, UE 120 may rank BS 110-3 based at least in part on an equation of the form:

$$R_n = Q_{meas,n} + Q_{hyst} - Q\text{offset}_{temp} + Q\text{offset}_{SCPTM} - Q_{offsetfreq\_cn\_type};$$

where $R_n$ represents a ranking for a neighbor cell for which an inter-core network reselection is to occur, $Q_{meas,n}$ represents the cell quality parameter for a different core network type than a current core network type, $Q_{hyst}$ represents the cell hysteresis parameter, $Q\text{offset}_{temp}$ represents the temporary offset parameter, $Q\text{offset}_{SCPTM}$ represents the single cell point-to-multipoint parameter, and $Q_{offsetfreq\_cn\_type}$ represents the core network type cell ranking offset parameter.

In contrast, UE 120 may rank a second neighbor cell (e.g., BS 110-2) without using the core network type cell ranking offset parameter based at least in part on the second neighbor cell being associated with a same core network type as a serving cell (e.g., BS 110-1). Additionally, or alternatively, the second neighbor cell may be associated with a plurality of types of core networks, which includes the same core network type as the serving cell. In this case, UE 120 may omit the core network type cell ranking offset parameter from determining a ranking for the second neighbor cell based at least in part on determining that UE 120 can reselect to the second neighbor cell and remain on the same type of core network. For example, BS 110-1 may be associated with an EPC connection and BS 110-2 may be associated with both an EPC connection and a 5GC connection, thereby enabling UE 120 to reselect to BS 110-2 and remain on the EPC connection. In some aspects, UE 120 may rank BS 110-2 based at least in part on an equation of the form:

$$R_s = Q_{meas,s} + Q_{hyst} - Q\text{offset}_{temp} + Q\text{offset}_{SCPTM};$$

where $R_s$ represents a ranking for a neighbor cell with a same core network type as a serving cell and $Q_{meas,s}$ represents the cell quality parameter for a same core network type as a current core network type.

As further shown in FIG. 7, and by reference number 720, in some aspects, UE 120 may selectively reselect to a neighbor cell with a different core network type than a current core network type. For example, when BS 110-3 is ranked higher than, for example, BS 110-2, UE 120 may reselect to BS 110-3 despite reselecting to BS 110-3 being an inter-core network reselection. In this way, UE 120 ensures that UE 120 camps onto a cell with a superior connection (e.g., a highest cell quality, a best hysteresis, and/or the like).

In contrast, as shown by reference number 725, in some aspects, when BS 110-2 ranks higher than BS 110-3, UE 120 may reselect to BS 110-2 to remain on a same core network type. In this case, BS 110-3 may still be associated with a better connection than BS 110-2 (or may be associated with a worse connection), but the connection may not be better by a sufficient difference to justify performing an inter-core network reselection. In this way, UE 120 reduces a signaling overhead and a utilization of power resources relative to reselecting to a different core network type.

In contrast, as shown by reference number 730, in some aspects, based at least in part on ranking the neighbor cells, UE 120 may determine to forgo an inter-frequency cell reselection. For example, based at least in part on ranking the neighbor cells, UE 120 may determine that no neighbor cell satisfies a threshold ranking for reselection and may remain on the serving cell. In this way, UE 120 reduces signaling overhead and a utilization of power resources relative to reselecting to a different core network type. In this way, UE 120 reduces inter-core network mobility, thereby improving network performance, UE performance, and/or the like.

As indicated above, FIG. 7 is provided as an example. Other examples may differ from what is described with respect to FIG. 7.

Figure 8A:
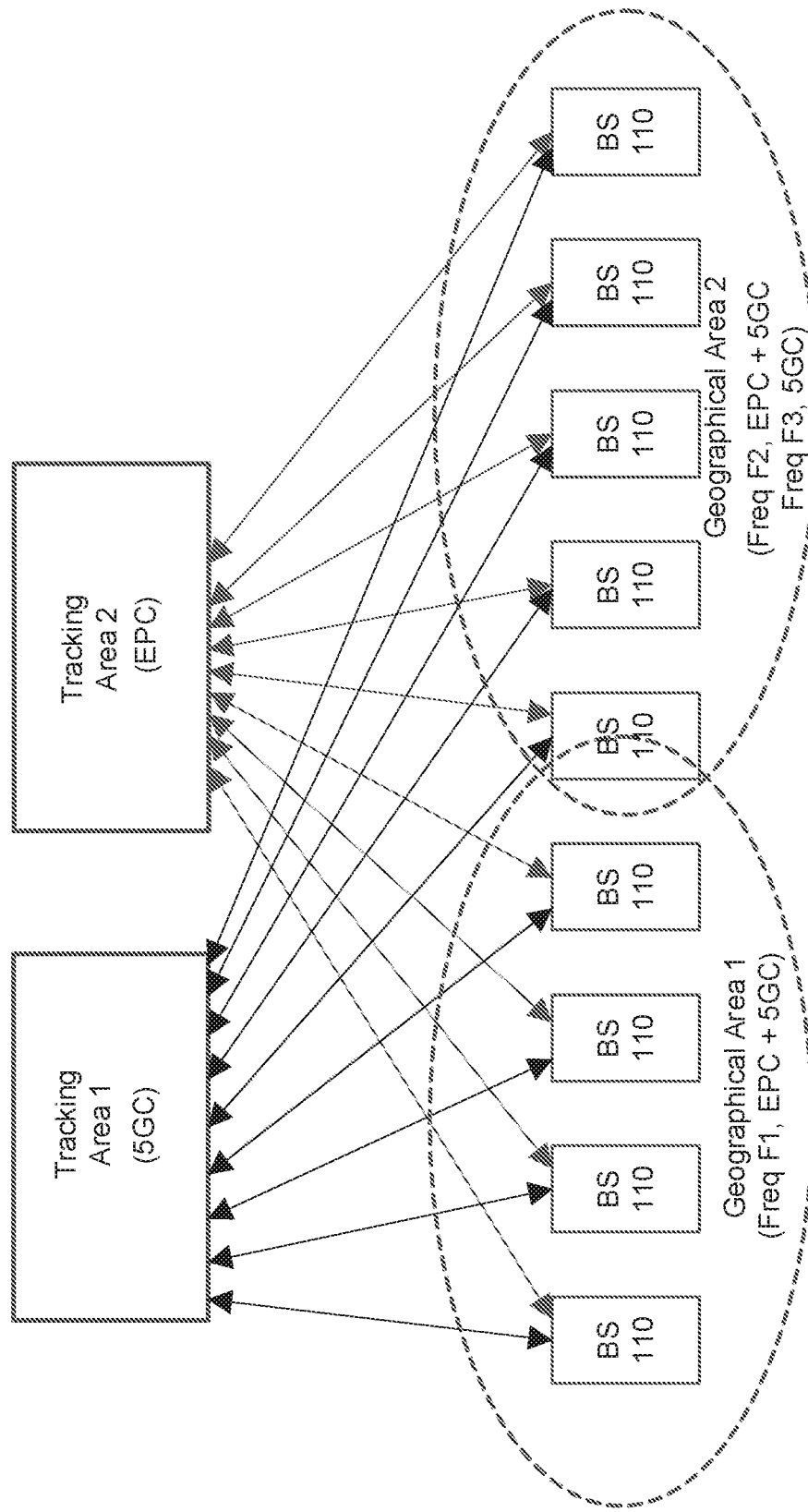
FIGS. 8A and 8B are diagrams illustrating examples of inter-core network reselection control, in accordance with various aspects of the present disclosure.
Figure 8B:
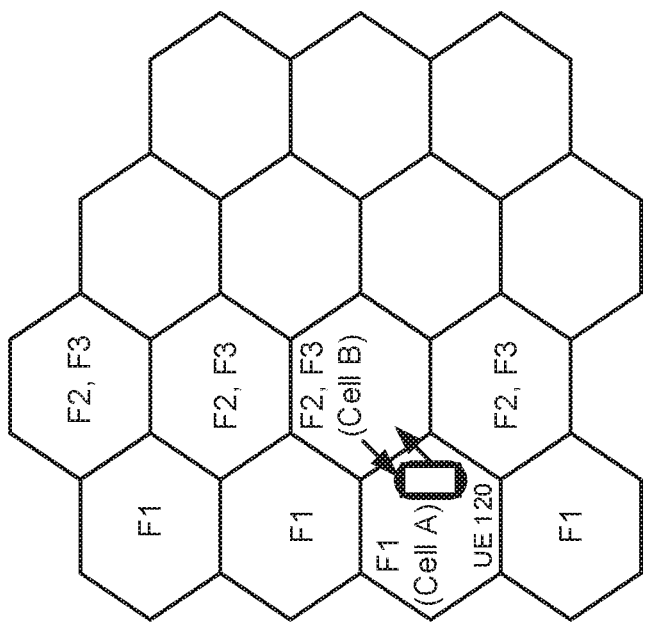

FIGS. 8A and 8B are diagrams illustrating an examples 800/800' of inter-core network reselection control, in accordance with various aspects of the present disclosure. As shown in FIG. 8A, different tracking areas (TAs) may be associated with different core network types (e.g., a 5G core (5GC) and an evolved packet core (EPC). The different core network types may be connected to BSs 110 in different geographical areas providing different frequencies. For example, As shown in FIG. 8A and by example 800, a first geographical area may include BSs 110 providing a first frequency with access to the EPC and the 5GC. In contrast, a second geographical area may include BSs 110 providing a second frequency, which has access to the EPC and the 5GC, and a third frequency, which has access to only the 5GC.

As shown in FIG. 8B, and by example 800' a UE 120 may be operating in a first region with a first frequency. In this case, UE 120 may be operating in a coverage enhancement mode connected to the evolved packet core (EPC) on cell A using a frequency F1. When UE 120 moves to a second region, a border cell B may support a frequency F2 and a frequency F3. Frequency F2 may be associated with a 5G core (5GC) and the EPC, whereas frequency F3 may be associated with only the 5GC. In some aspects, UE 120 may prioritize F2 with the EPC connection over F3 with the 5GC connection to avoid changing core network type. Moreover, by prioritizing the EPC on F2, when UE 120 moves back to region 1, UE 120 is able to stay on an EPC connection rather than switching core networks as may have happened had UE 120 selected the 5GC of F3.

In some aspects, UE 120 may receive a system information block (SIB) configured frequency priority indicator and may perform inter-frequency idle cell reselection based at least in part on the frequency priority indicator. For example, UE 120 may prioritize reselection to an inter-frequency neighbor cell with the same core network type and with a higher frequency priority than another neighbor cell with the same core network type and a lower frequency priority. For example, when UE 120 is camped on F1, which has a lower priority than F2 and F3, UE 120 may determine that F2 has a higher priority and the same core network type, which may trigger UE 120 to reselect to F2. In some aspects, UE 120 may set a threshold for determining whether to select to F3 based at least in part on whether a target cell frequency meets one or more criteria:

$$\text{Squal} > \text{Thresh}_{X,\ HighQ} + Q\text{offset}_{freq\_cn\_type} | \text{for a period of TreselectionEUTRAN, or}$$

$$\text{Srxlev} > \text{Thresh}_{X,\ HighP} + Q_{offset_{freq\_cn\_type}} | \text{for a period of TreselectionEUTRAN}$$

where Squal represents a cell selection quality threshold (in decibels (dB)), $\text{Thresh}_{X,\ HighQ}$ specifies an Squal threshold (in dB) used by a UE when reselecting towards a higher priority frequency than a current serving frequency, and Srxlev specifies a cell selection receive (RX) level value (in dB). In some aspects, $\text{thresh}_{X,\ HighP}$ specifies the Srxlev threshold (in dB) used by a UE when reselecting towards a higher priority frequency than the current serving frequency and $Q_{offsetfreq\_cn\_type}$ is a factor associated with F3 having a different core network type from F1. Similarly, when UE 120 is reselecting to a lower priority frequency, UE 120 may determine whether to select to a target cell or serving cell lower priority frequency based at least in part on one or more criteria:

$$\text{Squal} > \text{Thresh}_{X,\ LowQ} + Q\text{offset}_{freq\_cn\_type} | \text{for a period of TreselectionEUTRAN;}$$

$$\text{Squal} < \text{Thresh}_{Serving,\ LowQ} | \text{for a period of TreselectionEUTRAN;}$$

$$\text{Srxlev} > \text{Thresh}_{X,\ LowP} + Q\text{offset}_{freq\_cn\_type} | \text{for a period of TreselectionEUTRAN;}$$

$$\text{Srxlev} < \text{Thresh}_{Serving,\ LowP} | \text{for a period of TreselectionEUTRAN;}$$

where $\text{Thresh}_{X,\ LowQ}$ specifies an Squal threshold (in dB) used by a UE when reselecting towards a lower priority frequency than a current serving frequency; $\text{Thresh}_{Serving,\ LowQ}$ specifies an Squal threshold (in dB) used by the UE on the serving cell when reselecting towards a lower priority frequency; $\text{Thresh}_{X,\ LowP}$ specifies the Srxlev threshold (in dB) used by the UE when reselecting towards a lower priority frequency than the current serving frequency; and $\text{Thresh}_{Serving,\ LowP}$ specifies the Srxlev threshold (in dB) used by the UE on the serving cell when reselecting towards a lower priority frequency. In some aspects, Treselection$_{EUTRAN}$ specifies the cell reselection timer value Treselection$_{RAT}$ for E-UTRAN.

As indicated above, FIGS. 8A and 8B are provided as an example. Other examples may differ from what is described with respect to FIGS. 8A and 8B.

Figure 9:
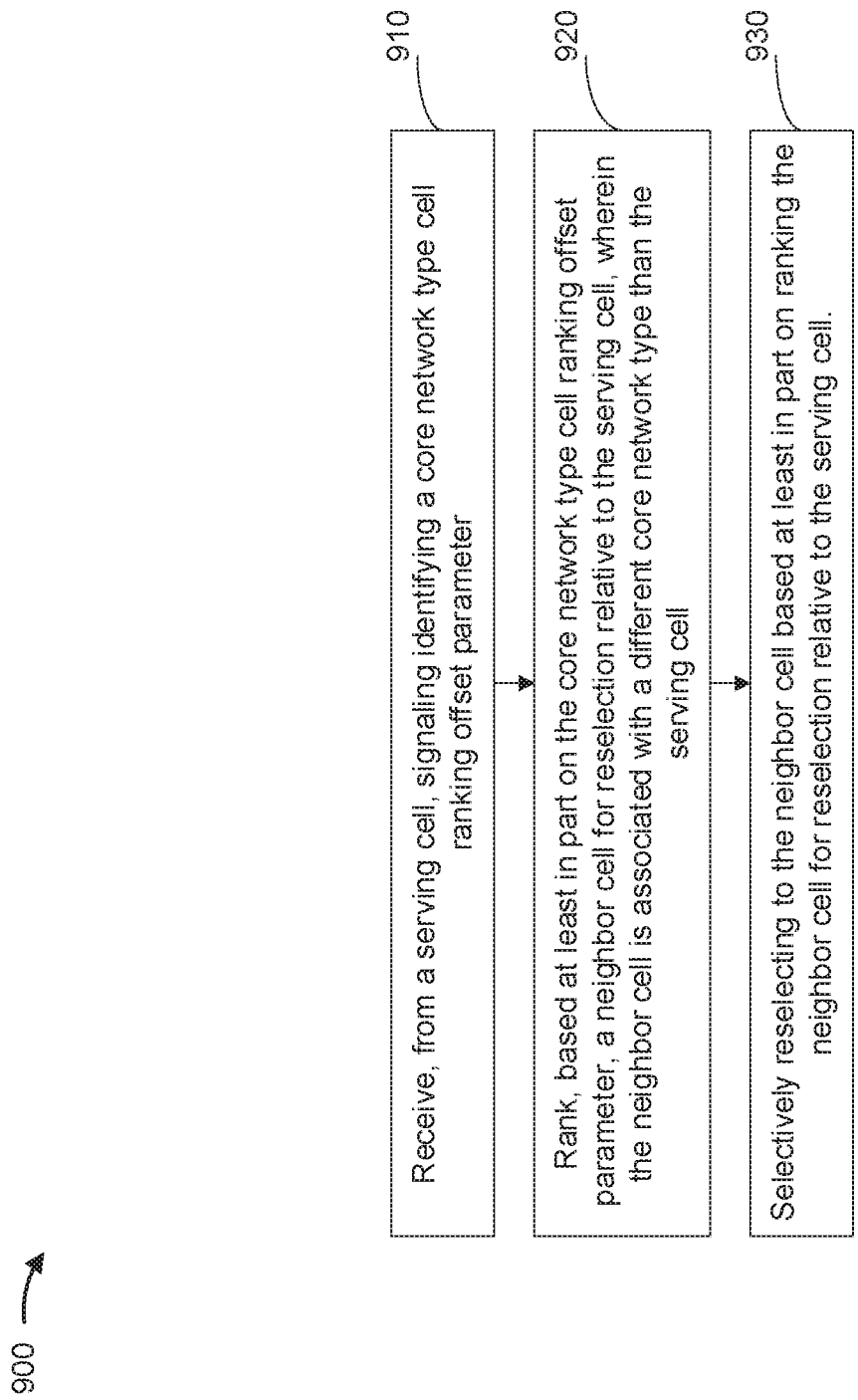
FIG. 9 is a diagram illustrating an example process performed, for example, by a user equipment, in accordance with various aspects of the present disclosure.

FIG. 9 is a diagram illustrating an example process 900 performed, for example, by a UE, in accordance with various aspects of the present disclosure. Example process 900 is an example where a UE (e.g., UE 120 and/or the like) performs operations associated with inter-core network reselection control.

As shown in FIG. 9, in some aspects, process 900 may include receiving, from a serving cell, signaling identifying a core network type cell ranking offset parameter (block 910). For example, the UE (e.g., using receive processor 258, transmit processor 264, controller/processor 280, memory 282, and/or the like) may receive, from a serving cell, signaling identifying a core network type cell ranking offset parameter, as described above.

As further shown in FIG. 9, in some aspects, process 900 may include ranking, based at least in part on the core network type cell ranking offset parameter, a neighbor cell for reselection relative to the serving cell, wherein the neighbor cell is associated with a different core network type than the serving cell (block 920). For example, the UE (e.g., using receive processor 258, transmit processor 264, controller/processor 280, memory 282, and/or the like) may rank, based at least in part on the core network type cell ranking offset parameter, a neighbor cell for reselection relative to the serving cell, as described above. In some aspects, the neighbor cell is associated with a different core network type than the serving cell.

As further shown in FIG. 9, in some aspects, process 900 may include selectively reselecting to the neighbor cell based at least in part on ranking the neighbor cell for reselection relative to the serving cell (block 930). For example, the UE (e.g., using receive processor 258, transmit processor 264, controller/processor 280, memory 282, and/or the like) may selectively reselect to the neighbor cell based at least in part on ranking the neighbor cell for reselection relative to the serving cell, as described above.

Process 900 may include additional aspects, such as any single aspect or any combination of aspects described below and/or in connection with one or more other processes described elsewhere herein.

In a first aspect, selectively reselecting to the neighbor cell includes selectively performing an inter-frequency reselection.

In a second aspect, selectively reselecting to the neighbor cell includes reselecting to another cell that is associated with a same core network type as the serving cell based at least in part on ranking the neighbor cell for reselection relative to the serving cell.

In a third aspect, alone or in combination with one or more of the first and second aspects, process 900 may include ranking another cell for reselection relative to the serving cell without using the core network type cell ranking offset parameter, the other cell being associated with a same core network type as the serving cell.

In a fourth aspect, alone or in combination with the third aspect, ranking, without using the core network type cell ranking offset parameter, the other cell for reselection relative to the serving cell is based at least in part on the other cell being associated with the same core network type as the serving cell.

In a fifth aspect, alone or in combination with one or more of the first through fourth aspects, ranking the neighbor cell for reselection relative to the serving cell includes ranking the neighbor cell for reselection relative to the serving cell based at least in part on at least one of a cell quality parameter, a cell hysteresis parameter, a temporary offset parameter, a cell ranking offset parameter, a single cell point-to-multipoint parameter, or a combination thereof.

In a sixth aspect, alone or in combination with one or more of the first through fifth aspects, receiving the core network type cell ranking offset parameter includes receiving a system information block message identifying the core network type cell ranking offset parameter.

In a seventh aspect, alone or in combination with one or more of the first through sixth aspects, the core network type cell ranking offset parameter is configured on a per public land mobile network basis.

In an eighth aspect, alone or in combination with one or more of the first through sixth aspects, the core network type cell ranking offset parameter is associated with a common configuration across a plurality of public land mobile networks.

In a ninth aspect, alone or in combination with one or more of the first through eighth aspects, a core network type of one of the serving cell or the neighbor cell is at least one of an evolved packet core network or a 5G core network.

In a tenth aspect, alone or in combination with one or more of the first through ninth aspects, the serving cell is associated with a single core network type and the neighbor cell is associated with a different, single core network type.

In an eleventh aspect, alone or in combination with one or more of the first through ninth aspects, the serving cell is associated with a plurality of core network types, and the plurality of core network types include a first core network type that is the same as the neighbor cell and a second core network type that is different from the neighbor cell. In some aspects, the UE is connected to the serving cell using the second core network type.

In a twelfth aspect, alone or in combination with one or more of the first through eleventh aspects, ranking, based at least in part on the core network type cell ranking offset parameter, the neighbor cell for reselection relative to the serving cell is based at least in part on the neighbor cell being associated with the different core network type than the serving cell.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving, from a serving cell, signaling, identifying a core network type cell ranking offset parameter, and an indication of whether to use the core network type cell ranking offset parameter;
   ranking a neighbor cell for reselection relative to the serving cell based at least in part on receiving the signaling, identifying the core network type cell ranking offset parameter, and the indication of whether to use the core network type cell ranking offset parameter,
      wherein the neighbor cell is ranked based at least in part on the core network type cell ranking offset parameter when the neighbor cell is associated with a different core network type than the serving cell, and
      wherein the neighbor cell is ranked, without using the core network type cell ranking offset parameter, when the neighbor cell is associated with a same core network type as the serving cell; and
   selectively reselecting to the neighbor cell based at least in part on ranking the neighbor cell for reselection relative to the serving cell.

2. The method of claim 1, wherein the selectively reselecting to the neighbor cell comprises:
   selectively performing an inter-frequency reselection.

3. The method of claim 1, further comprising:
   reselecting to another cell that is associated with the same core network type as the serving cell.

4. The method of claim 1, further comprising:
   reselecting to another cell that is associated with the same core network type as the serving cell based at least in part on one or more threshold cell reselection criteria associated with the other cell.

5. The method of claim 1, further comprising:
   ranking another cell for reselection relative to the serving cell without using the core network type cell ranking offset parameter,
      wherein the other cell is associated with the same core network type as the serving cell.

6. The method of claim 5, wherein ranking, without using the core network type cell ranking offset parameter, the other cell for reselection relative to the serving cell is based at least in part on the other cell being associated with the same core network type as the serving cell.

7. The method of claim 1, wherein, when the neighbor cell is associated with the same core network type as the serving cell, the neighbor cell is ranked based at least in part on at least one of:
   a cell quality parameter,
   a cell hysteresis parameter,
   a temporary offset parameter,
   a cell ranking offset parameter,
   a single cell point-to-multipoint parameter, or
   a combination thereof.

8. The method of claim 1, wherein receiving the signaling identifying the core network type cell ranking offset parameter comprises:
   receiving a system information block message identifying the core network type cell ranking offset parameter.

9. The method of claim 1, wherein the core network type cell ranking offset parameter is configured on a per public land mobile network basis.

10. The method of claim 1, wherein the core network type cell ranking offset parameter is associated with a common configuration across a plurality of public land mobile networks.

11. The method of claim 1, wherein a core network type of one of the serving cell or the neighbor cell is at least one of an evolved packet core network or a 5G core network.

12. The method of claim 1, wherein the serving cell is associated with a single core network type and the neighbor cell is associated with a different, single core network type.

13. The method of claim 1, wherein the serving cell is associated with a plurality of core network types, the plurality of core network types including a first core network type that is the same as the neighbor cell and a second core network type that is different from the neighbor cell, and
   wherein the UE is connected to the serving cell using the second core network type.

14. The method of claim 1, wherein receiving the indication of whether to use the core network type cell ranking offset parameter comprises:
   receiving a system information block message comprising the indication of whether to use the core network type cell ranking offset parameter.

15. A user equipment (UE) for wireless communication, comprising:
   a memory; and
   one or more processors coupled to the memory, the one or more processors configured to:
      receive, from a serving cell, signaling,. identifying a core network type cell ranking offset parameter, and an indication of whether to use the core network type cell ranking offset parameter;

rank a neighbor cell for reselection relative to the serving cell based at least in part on receiving the signaling, identifying the core network type cell ranking offset parameter, and the indication of whether to use the core network type cell ranking offset parameter, wherein the neighbor cell is ranked based at least in part on the core network type cell ranking offset parameter when the neighbor cell is associated with a different core network type than the serving cell, and wherein the neighbor cell is ranked, without using the core network type cell ranking offset parameter, when the neighbor cell is associated with a same core network type as the serving cell; and selectively reselect to the neighbor cell based at least in part on ranking the neighbor cell for the reselection relative to the serving cell.

16. The UE of claim 15, wherein the one or more processors, when selectively reselecting to the neighbor cell, are configured to:
selectively perform an inter-frequency reselection.

17. The UE of claim 15, wherein the one or more processors are further configured to:
reselect to another cell that is associated with the same core network type as the serving cell.

18. The UE of claim 15, wherein the one or more processors are further configured to:
rank another cell for the reselection relative to the serving cell without using the core network type cell ranking offset parameter,
wherein the other cell is associated with the same core network type as the serving cell.

19. The UE of claim 18, wherein the ranking, without using the core network type cell ranking offset parameter, the other cell for the reselection relative to the serving cell is based at least in part on the other cell being associated with the same core network type as the serving cell.

20. The UE of claim 15, wherein, when the neighbor cell is associated with the same core network type as the serving cell, the neighbor cell is ranked based at least in part on at least one of:
a cell quality parameter,
a cell hysteresis parameter,
a temporary offset parameter,
a cell ranking offset parameter,
a single cell point-to-multipoint parameter, or
a combination thereof.

21. The UE of claim 15, wherein the one or more processors, when receiving the signaling identifying the core network type cell ranking offset parameter, are configured to:
receive a system information block message identifying the core network type cell ranking offset parameter.

22. The UE of claim 15, wherein the core network type cell ranking offset parameter is configured on a per public land mobile network basis.

23. The UE of claim 15, wherein the core network type cell ranking offset parameter is associated with a common configuration across a plurality of public land mobile networks.

24. The UE of claim 15, wherein a core network type of one of the serving cell or the neighbor cell is at least one of an evolved packet core network or a 5G core network.

25. The UE of claim 15, wherein the serving cell is associated with a single core network type and the neighbor cell is associated with a different, single core network type.

26. The UE of claim 15, wherein the serving cell is associated with a plurality of core network types, the plurality of core network types including a first core network type that is the same as the neighbor cell and a second core network type that is different from the neighbor cell, and
wherein the UE is connected to the serving cell using the second core network type.

27. The UE of claim 15, wherein the one or more processors, when receiving the indication of whether to use the core network type cell ranking offset parameter, are configured to:
receive a system information block message comprising the indication of whether to use the core network type cell ranking offset parameter.

28. A non-transitory computer-readable medium storing one or more instructions for wireless communication, the one or more instructions comprising:
one or more instructions that, when executed by one or more processors of a user equipment, cause the one or more processors to:
receive, from a serving cell, signaling,. identifying a core network type cell ranking offset parameter, and an indication of whether to use the core network type cell ranking offset parameter;
rank a neighbor cell for reselection relative to the serving cell based at least in part on receiving the signaling, identifying the core network type cell ranking offset parameter, and the indication of whether to use the core network type cell ranking offset parameter,
wherein the neighbor cell is ranked based at least in part on the core network type cell ranking offset parameter when the neighbor cell is associated with a different core network type than the serving cell, and
wherein the neighbor cell is ranked, without using the core network type cell ranking offset parameter, when the neighbor cell is associated with a same core network type as the serving cell; and
selectively reselect to the neighbor cell based at least in part on ranking the neighbor cell for reselection relative to the serving cell.

29. The non-transitory computer-readable medium of claim 28, wherein the one or more instructions, that cause the one or more processors to selectively reselect to the neighbor cell, cause the one or more processors to:
selectively perform an inter-frequency reselection.

30. The non-transitory computer-readable medium of claim 28, wherein the one or more instructions, when executed by the one or more processors, further cause the one or more processors to:
reselect to another cell that is associated with the same core network type as the serving cell.

31. The non-transitory computer-readable medium of claim 28, wherein the one or more instructions, when executed by the one or more processors, further cause the one or more processors to:
rank another cell for reselection relative to the serving cell without using the core network type cell ranking offset parameter,
wherein the other cell is associated with the same core network type as the serving cell.

32. The non-transitory computer-readable medium of claim 31, wherein ranking, without using the core network type cell ranking offset parameter, the other cell for reselection relative to the serving cell is based at least in part on the other cell being associated with the same core network type as the serving cell.

33. The non-transitory computer-readable medium of claim 28, wherein, when the neighbor cell is associated with the same core network type as the serving cell, the neighbor cell is ranked based at least in part on at least one of:
a cell quality parameter,
a cell hysteresis parameter,
a temporary offset parameter,
a cell ranking offset parameter,
a single cell point-to-multipoint parameter, or
a combination thereof.

34. The non-transitory computer-readable medium of claim 28, wherein the one or more instructions, that cause the one or more processors to receive the signaling identifying the core network type cell ranking offset parameter, cause the one or more processors to:
receive a system information block message identifying the core network type cell ranking offset parameter.

35. The non-transitory computer-readable medium of claim 28, wherein the core network type cell ranking offset parameter is configured on a per public land mobile network basis.

36. The non-transitory computer-readable medium of claim 28, wherein the core network type cell ranking offset parameter is associated with a common configuration across a plurality of public land mobile networks.

37. The non-transitory computer-readable medium of claim 28, wherein a core network type of one of the serving cell or the neighbor cell is at least one of an evolved packet core network or a 5G core network.

38. The non-transitory computer-readable medium of claim 28, wherein the serving cell is associated with a single core network type and the neighbor cell is associated with a different, single core network type.

39. The non-transitory computer-readable medium of claim 28, wherein the serving cell is associated with a plurality of core network types, the plurality of core network types including a first core network type that is the same as the neighbor cell and a second core network type that is different from the neighbor cell, and
wherein the UE is connected to the serving cell using the second core network type.

40. The non-transitory computer-readable medium of claim 28, wherein the one or more instructions, that cause the one or more processors to receive the indication of whether to use the core network type cell ranking offset parameter, cause the one or more processors to:
receive a system information block message comprising the indication of whether to use the core network type cell ranking offset parameter.

41. An apparatus for wireless communication, comprising:
means for receiving, from a serving cell, signaling, identifying a core network type cell ranking offset parameter, and an indication of whether to use the core network type cell ranking offset parameter;
means for ranking a neighbor cell for reselection relative to the serving cell based at least in part on receiving the signaling, identifying the core network type cell ranking offset parameter, and the indication of whether to use the core network type cell ranking offset parameter,
wherein the neighbor cell is ranked based at least in part on the core network type cell ranking offset parameter when the neighbor cell is associated with a different core network type than the serving cell, and
wherein the neighbor cell is ranked, without using the core network type cell ranking offset parameter, when the neighbor cell is associated with a same core network type as the serving cell; and
means for selectively reselecting to the neighbor cell based at least in part on ranking the neighbor cell for reselection relative to the serving cell.

42. The apparatus of claim 41, wherein the means for selectively reselecting to the neighbor cell comprises:
means for selectively performing an inter-frequency reselection.

43. The apparatus of claim 41, further comprising:
means for reselecting to another cell that is associated with the same core network type as the serving cell.

44. The apparatus of claim 41, further comprising:
means for ranking another cell for reselection relative to the serving cell without using the core network type cell ranking offset parameter,
wherein the other cell is associated with the same core network type as the serving cell.

45. The apparatus of claim 44, wherein the ranking, without using the core network type cell ranking offset parameter, the other cell for reselection relative to the serving cell is based at least in part on the other cell being associated with the same core network type as the serving cell.

46. The apparatus of claim 41, wherein, when the neighbor cell is associated with the same core network type as the serving cell, the neighbor cell is ranked based at least in part on, at least one of:
a cell quality parameter,
a cell hysteresis parameter,
a temporary offset parameter,
a cell ranking offset parameter,
a single cell point-to-multipoint parameter, or
a combination thereof.

47. The apparatus of claim 41, wherein the means for receiving the signaling identifying the core network type cell ranking offset parameter comprises:
means for receiving a system information block message identifying the core network type cell ranking offset parameter.

48. The apparatus of claim 41, wherein the core network type cell ranking offset parameter is configured on a per public land mobile network basis.

49. The apparatus of claim 41, wherein the core network type cell ranking offset parameter is associated with a common configuration across a plurality of public land mobile networks.

50. The apparatus of claim 41, wherein a core network type of one of the serving cell or the neighbor cell is at least one of an evolved packet core network or a 5G core network.

* * * * *